UNITED STATES PATENT OFFICE.

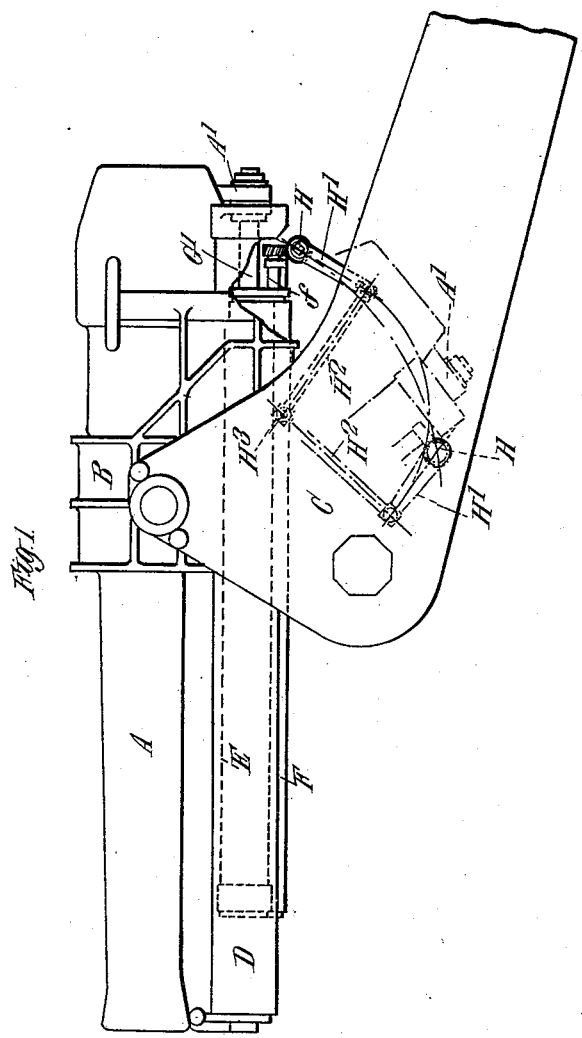

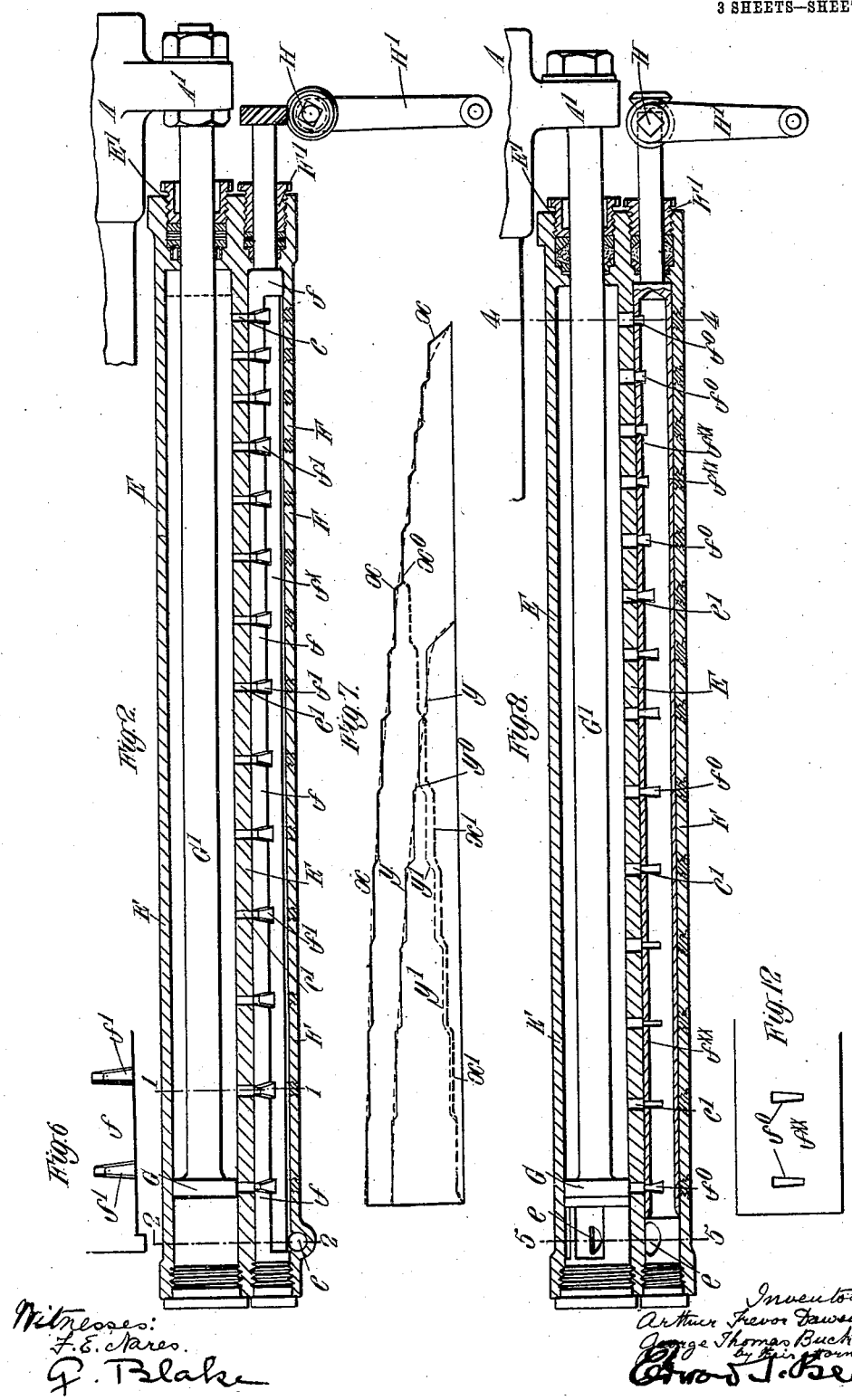

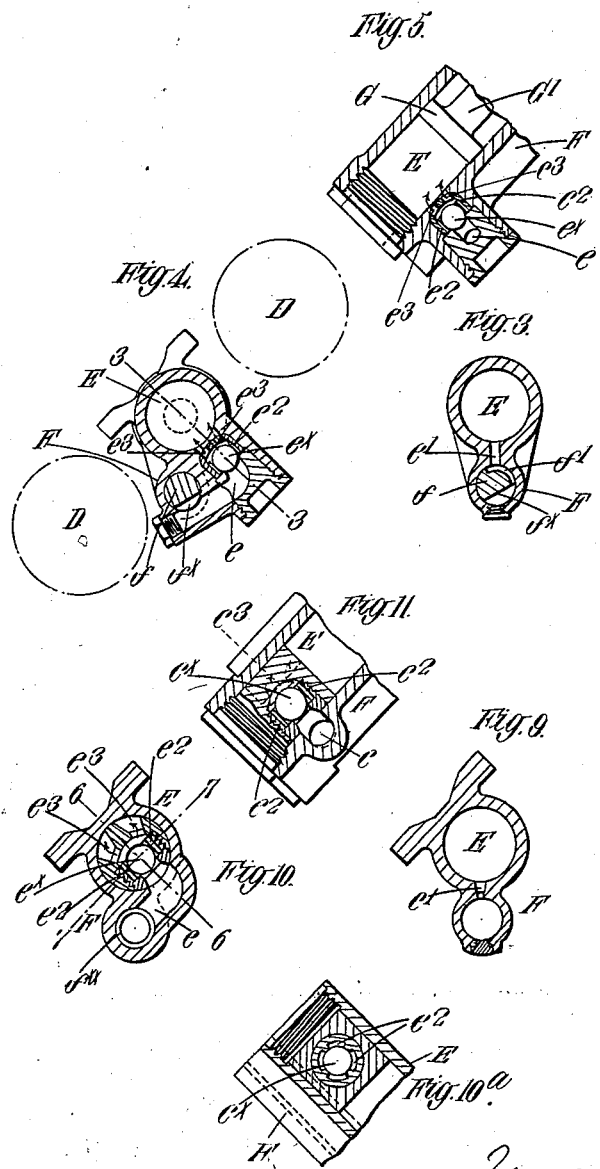

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF LONDON, ENGLAND.

BRAKE MECHANISM FOR RECOILING GUNS.

No. 899,206.　　　　Specification of Letters Patent.　　　　Patented Sept. 22, 1908.

Application filed May 27, 1907. Serial No. 375,880.

*To all whom it may concern:*

Be it known that we, ARTHUR TREVOR DAWSON, lieutenant Royal Navy, director and superintendent of Ordnance Works, and GEORGE THOMAS BUCKHAM, engineer, both subjects of the King of Great Britian, residing at 32 Victoria street, Westminster, in the county of London, England, have invented certain new and useful Improvements in Brake Mechanism for Recoiling Guns, of which the following is a specification.

This invention relates to fluid pressure brakes of the kind that are provided with apparatus for regulating the length of recoil of a gun in accordance with its angle of elevation and for retarding the return of the gun when running home so as to prevent shock to the mounting.

The chief object of our invention is to provide a brake of this type giving a positive cut-off to the recoil at the required positions and enabling valves or loose pieces on the recoiling parts of the brake to be dispensed with.

The said invention comprises a brake cylinder and a valve cylinder placed side by side and communicating with each other at suitable intervals by means of lateral apertures or ports. The valve cylinder is provided with a valve which is capable of angular displacement either by hand or automatically by the movement of the gun in changing its angle of elevation. The said valve is formed with a number of lateral channels corresponding with the lateral apertures or ports connecting the valve cylinder with the brake cylinder, the said lateral channels meeting in a longitudinal channel in the valve and being so made that the portion of their area exposed beneath the lateral channels can be varied by angularly displacing the said valve. At the forward or muzzle end of the cylinders is a transverse connecting passage controlled by a non-return valve. On recoil, the fluid passes from the rear of the brake piston through the various lateral apertures or ports in the brake cylinder and the lateral channels in the valve and thus reaches the longitudinal channel whence it flows to the front of the brake piston through the aforesaid connecting passage controlled by the non-return valve. As the said piston moves rearward in recoil, it successively cuts off the cylinder ports thus reducing the area through which the fluid must pass from the rear of the piston. On the return stroke of the piston, the passage controlled by the non-return valve is closed by the same and the whole of the fluid has to pass from the front of the piston through the aforesaid cylinder ports to the rear of the piston. The effective area of these ports will increase from the beginning of the return stroke, until the area of the ports to the rear of the piston equals the area of those in front of it. After passing this point, the effective area will begin to decrease again as successive apertures towards the front are shut off by the piston. The port-area will thus be gradually decreased and the gun brought home without shock.

In order that our said invention may be clearly understood and readily carried into effect we will describe the same more fully with reference to the accompanying drawings, in which:—

Figure 1 is a side elevation illustrating our improved brake applied to a howitzer. Fig. 2 is a longitudinal section of the brake cylinder and valve cylinder. Fig. 3 is a transverse section taken on the line 1.1. of Fig. 2, looking towards the right. Fig. 4 is a transverse section taken on the line 2.2 of Fig. 2, also looking towards the right. Fig. 5 is a longitudinal section taken on the line 3.3 of Fig. 4. Fig. 6 is a diagrammatic development of a portion of the valve key illustrating the shape of the lateral channels therein. Fig. 7 is a diagram of the port-openings during the recoil and return movements of the brake piston when the gun participates in the maximum recoil and in the minimum recoil. Fig. 8 is a longitudinal section of the brake cylinder and valve cylinder illustrating a modification. Figs. 9 and 10 are transverse sections taken respectively on the lines 4.4 and 5.5 of Fig. 8 looking towards the right. Fig. 10$^a$ is a section on the line 7—7 of Fig. 10. Fig. 11 is a longitudinal section taken on the line 6.6 of Fig. 10. Fig. 12 is a diagrammatic development of a portion of the valve illustrating the shape of the lateral channels therein.

Like letters of reference indicate similar parts in all the figures.

A is the gun adapted to recoil in a cradle B trunnioned in the trail C.

D D are the return spring casings and E is the brake cylinder. The said brake cylinder is for convenience formed in one with the valve cylinder F and the brake piston G is made solid with the piston rod G' which extends through a stuffing box E' at the rear end of the cylinder E and is connected in the usual manner to the breech end of the gun through the lug A'.

Connections are made at suitable intervals between the brake cylinder E and the valve cylinder F by means of the apertures or ports $e'$ $e'$, the spacing of these ports being determined by the character of the port-opening diagram which is required.

$f$ is the valve which is fitted in the valve cylinder F. It has its rear end extended through a stuffing box F', and connected through suitable gearing, with a transverse shaft H, by means of which the valve can be angularly displaced about its axis. In the example shown in Figs. 2 to 7, the said valve has a flat or groove forming the longitudinal channel $f^\times$. Leading from this channel are a number of lateral channels $f'$ $f'$ formed around the circumference of the valve and serving to connect the longitudinal channel $f^\times$ with the aforesaid cylinder ports $e'$. At the muzzle or forward end of the cylinder F the aforesaid longitudinal channel $f^\times$ is connected to the brake cylinder E by means of the passage $e$ (Figs. 4 and 5), which is closed to the flow of the fluid in one direction by the non-return valve $e^\times$. The aforesaid lateral or circumferential channels $f'$ are made taper in width, so that the area through which the fluid has to flow in passing from the cylinder ports $e'$ to the longitudinal channel $f^\times$ in the valve can be regulated by turning the valve about its axis, it being possible to altogether close some of the passages at the rear end of the brake.

When firing with maximum or full recoil, the lateral or circumferential channels $f'$ have their total maximum area open to the passage of the fluid, and at the beginning of the recoil all the ports $e'$ along the cylinder are open. Through all these the fluid passes to the longitudinal channel $f^\times$, and thence through the passage $e$ controlled by the non-return valve $e^\times$ to the brake cylinder E in front of the piston G.

During the recoil movement, the piston G successively cuts off the cylinder ports $e'$ the distance between which gradually decreases towards the rear of the cylinder from the space behind it so that the total area of the ports through which the fluid passes to reach the longitudinal passage $f^\times$ of the valve and thence the passage to the front of the piston, is gradually reduced, with the result that the resistance to the recoil movement, gradually increases and finally brings the gun to rest at the end of the recoil. The thick full lines $x$ shown in the diagram Fig. 7 illustrate this gradual reduction in area of the port openings. On the return movement of the gun under the influence of the return springs, the fluid in front of the piston G has to be forced through the cylinder ports $e'$ into the longitudinal passage $f^\times$ and thence through the ports $f''$ back to the cylinder E in the space behind the piston, the passage $e$ at the muzzle end of the said cylinders being at this time closed by the non-return valve $e^\times$. During this advance movement of the piston, the effective area of the ports $e'$ will gradually increase until the area of the ports behind the piston is equal to that of the ports in front of the piston, that is to say until the point $x^0$ in the diagram Fig. 7, is reached. The continued forward movement of the piston then causes a gradual diminution of the effective port-area as the ports in front of the piston are one by one cut off from the space in front of the piston and opened to that in the rear thereof, with the result that the resistance in front of the piston increases until the gun is finally brought to rest in its fully advanced position without shock. The dotted lines $x'$ in the diagram Fig. 7 illustrate this gradual diminution in the port-area during the advance movement of the piston.

In consequence of the shape given to the aforesaid circumferential or lateral channels $f'$, the area through which the fluid must pass can be reduced by angularly displacing the valve $f$, and successive apertures from the rear end may be entirely closed, thus allowing the length of recoil to be regulated as desired by the angular movement of the valve. The retarding action on the return stroke will take place whatever may be the length of the recoil.

The thin full lines $y$ in the diagram Fig. 7 illustrate the manner in which the port-area diminishes when the valve has been adjusted into a position for giving the minimum recoil. On the return movement when the piston reaches the point $y^0$ the port-area in front of the piston gradually diminishes as shown by the dotted lines $y'$, so that the gun comes quietly to rest as in the case of the maximum recoil.

It will of course be obvious that the valve may be set into various angular positions intermediate between the extreme positions represented by the diagram and that the length of the recoil will be varied accordingly.

The angular movement may be given to the valve by hand as aforesaid or automatically as the gun is elevated and in the latter case we provide the said shaft H with a crank H' connected by a radius link H² and universal joints to the trail C at any convenient point as H³. The dot and dash lines in Fig. 1 show the position the parts assume when the gun is at its extreme angle of elevation.

Referring more particularly to the modification illustrated by Figs. 8 to 12, the valve is in this case made in the form of a tube $f^{\times\times}$ the hole in the center then serving as the aforesaid longitudinal channel $f^\times$. The circumferential channels $f'$ shown in the preceding arrangement will then be replaced by elongated holes $f^0$ pierced through the tube, the width of these holes being varied in the same way as the width of the circumferential channels $f''$. In other respects this arrangement is like that already set forth above and therefore needs no further description.

In both constructions the non-return valve $e^x$ is contained in a casing having passages $e^2$ through which the fluid passes when the said valve is raised, the fluid finally entering the cylinder E through passages $e^3$ as shown by arrows in Figs. 4 to 11.

What we claim and desire to secure by Letters Patent of the United States is:—

1. Brake mechanism for recoiling guns, consisting in the combination of a brake cylinder having a single series of ports communicating with a common longitudinal channel provided with a passage leading to the brake cylinder, a non-return valve controlling the said passage, an adjustable valve situated within said longitudinal channel and having a single series of openings coöperating with the ports in the brake cylinder, and means for operating the said adjustable valve from the exterior.

2. Brake mechanism for recoiling guns, consisting in the combination of a brake cylinder having a single series of unequally spaced ports communicating with a common longitudinal channel provided with a passage leading to the brake cylinder, a non-return valve controlling the said passage, an adjustable valve situated within said longitudinal channel and having a single series of openings coöperating with the ports in the brake cylinder, and means for operating the said adjustable valve from the exterior.

3. Brake mechanism for recoiling guns, consisting in the combination of a brake cylinder having a single series of unequally spaced ports communicating with a common longitudinal channel provided with a passage leading to the front end of the brake cylinder, a non-return valve controlling the said passage, an angularly adjustable valve situated within said longitudinal channel and having a single series of lateral openings coöperating with the ports in the brake cylinder, and means for operating the said angularly adjustable valve from the exterior.

4. Brake mechanism for recoiling guns, consisting in the combination of a brake cylinder having a series of ports communicating with a common longitudinal channel provided with a passage leading to the brake cylinder, a non-return valve controlling the said passage, an angularly adjustable valve situated within said longitudinal channel and having lateral openings of elongated and tapered shape coöperating with the ports in the brake cylinder, and means for operating the said angularly adjustable valve from the exterior.

5. Brake mechanism for recoiling guns, consisting in the combination of a brake cylinder having a series of unequally spaced ports communicating with a common longitudinal channel provided with a passage leading to the brake cylinder, a non-return valve controlling the said passage, an angularly adjustable valve situated within said longitudinal channel and having lateral openings of elongated and tapered shape coöperating with the ports in the brake cylinder, and means for operating the said angularly adjustable valve from the exterior.

6. Brake mechanism for recoiling guns, consisting in the combination of a brake cylinder having a series of unequally spaced ports communicating with a common longitudinal channel provided with a passage leading to the front end of the brake cylinder, a non-return valve controlling the said passage, a hollow, angularly adjustable valve situated within said longitudinal channel and having lateral openings of elongated and tapered shape coöperating with the ports in the brake cylinder, and means for operating the said angularly adjustable valve from the exterior.

7. Brake mechanism for recoiling guns, consisting in the combination of a brake cylinder having a series of ports communicating with a common longitudinal channel provided with a passage leading to the brake cylinder, a non-return valve controlling the said passage, an adjustable valve situated within said longitudinal channel and having a single series of openings coöperating with the ports in the brake cylinder, and means for automatically operating the said adjustable valve from the exterior in accordance with the changes in the elevation of the gun.

8. Brake mechanism for recoiling guns, consisting in the combination of a brake cylinder having a series of ports communicating with a common longitudinal channel provided with a passage leading to the brake cylinder, a non-return valve controlling the said passage, an angularly adjustable valve situated within said longitudinal channel and having openings coöperating with the ports in the brake cylinder, toothed gearing connected with said angularly adjustable valve, a radius link hinged to a non-recoiling part of the gun mounting, and a crank coupling the free end of said radius link to the toothed gearing.

In testimony whereof we affix our signatures in presence of two witnesses.

ARTHUR TREVOR DAWSON.
GEORGE THOMAS BUCKHAM.

Witnesses:
E. E. LARKINS,
HENRY KING.